(12) United States Patent
Klotzer

(10) Patent No.: US 8,350,211 B2
(45) Date of Patent: Jan. 8, 2013

(54) QUANTUM ENTITY STATE PROCESSING SYSTEM AND METHOD HAVING HETEROGENEOUSLY INFLUENCEABLE QUANTUM ENTITY SECONDARY STATES AND CONDITIONED QUANTUM ENTITY TERTIARY STATES

(76) Inventor: Daniel S. Klotzer, St. Louis, MO (US)

( * ) Notice: Subject to any disclaimer, the term of this patent is extended or adjusted under 35 U.S.C. 154(b) by 411 days.

(21) Appl. No.: 12/655,792

(22) Filed: Jan. 6, 2010

(65) Prior Publication Data

US 2010/0114805 A1   May 6, 2010

Related U.S. Application Data

(63) Continuation-in-part of application No. 10/757,615, filed on Jan. 13, 2004, now Pat. No. 7,777,177.

(60) Provisional application No. 60/439,712, filed on Jan. 13, 2003.

(51) Int. Cl.
   *G01J 4/00*   (2006.01)
(52) U.S. Cl. .................... 250/227.17; 250/225
(58) Field of Classification Search ............. 250/227.17–227.19, 550, 214 R, 250/225; 356/450–456, 484; 359/112; 324/307–312, 248; 257/23–33

See application file for complete search history.

(56) References Cited

U.S. PATENT DOCUMENTS

| | | | | |
|---|---|---|---|---|
| 6,430,345 B1 * | 8/2002 | Dultz et al. | .................... | 385/122 |
| 6,678,054 B1 * | 1/2004 | Dress et al. | .................... | 356/450 |

* cited by examiner

*Primary Examiner* — Que T Le
(74) *Attorney, Agent, or Firm* — Klotzer Patents; Daniel Klotzer

(57) ABSTRACT

Systems and methods are described for processing quantum entity states by utilizing interference phenomena, and more specifically self-interference outcomes. The quantum entity states are embodiable in fermions and/or bosons, expressly including photons. Certain embodiments can utilize input quantum entity states that encompass one or more separable quantum entities and can be arranged to produce predictable outcome differences that are alterable in accordance with differences and/or similarities between separate input quantum entities. Additional outcome alterations are effectible via static and/or dynamic quantum entity state influencing constituents. Even further outcome alterations are effectible by associative quantum state influencing constituents that are additionally utilizable for interrelating separable embodiments. Interrelations of separable embodiments are achievable as well by employing at least a portion of at least a first outcome quantum entity state as an intermediary or a final interactor with at least a portion of a differing separable embodiments' quantum entity state.

22 Claims, 2 Drawing Sheets

QUANTUM ENTITY STATE PROCESSING SYSTEM AND METHOD HAVING HETEROGENEOUSLY INFLUENCEABLE QUANTUM ENTITY SECONDARY STATES AND CONDITIONED QUANTUM ENTITY TERTIARY STATES

CROSS-REFERENCE TO RELATED APPLICATIONS

This application is a continuation-in-part of U.S. Non-Provisional Utility patent application Ser. No. 10/757,615, filed Jan. 13, 2004 now U.S. Pat. No. 7,777,177, and claims the benefit of its priority date; the Ser. No. 10/757,615 application priority date stems from U.S. Provisional Utility Patent Application Ser. No. 60/439,712, filed Jan. 13, 2003, which is also the priority date claimed by the present application; and the entire disclosures of both the U.S. Non-Provisional Utility patent application Ser. No. 10/757,615, and the U.S. Provisional Utility Patent Application Ser. No. 60/439,712, are hereby incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention relates generally to processing and/or being responsive to interactions with and/or between at least one quantum state-entity, and more specifically to utilizing quantum attributes of at least one quantum state-entity to potentially realizing interference related phenomena, or a congener thereof, with these interactions as well as prospectively further utilizing these interactions for various forms of processing, including information processing and other purposes.

2. Related Art

Of the potential utilizations for quantum technology currently being developed, information processing has become among the more prominent. Due to the impetus provided by the substantial benefits that appear to be realizable and the concomitant need to confront and surmount many of the present difficulties in performing quantum procedures, research in quantum information processing has become a crucible for forging advances in quantum technology. Accordingly, in many instances, a description of manners of interacting with and/or manipulating quantum state-entities can be equivalent to a description of the crux of quantum state-entities' utilizations for quantum information processing, and vice versa. The employment of these quantum technologies is also applicable to a wide gamut of other uses as well, of course, and a description that is ostensibly focused on the development of a particular technique for information processing is regularly widely applicable to other situations also.

Among the foremost of the varying actual (as opposed to theoretical) manners of effecting a particular quantum process are utilizations of quantum optics. Because the benefits of quantum optics are diverse and well known, its use is often central to discussions of quantum developments, whether in the realm of fundamental advances in knowledge or in the realm of practical applications. This broad utility of quantum optics has driven a substantial portion of the ongoing efforts to commercially develop quantum technologies as evinced, for example, by the magnitude of patent applications that deploy quantum optics to perform their central functions. Many of both the basic and more advanced aspects of quantum optics, including manners of manipulating photons with quantum optics, are well known to those of skill in the art, and many explicatory resource are available on the world-wide-web (www) that provide anyone with ready access to wide ranging and detailed reference resources on various quantum technologies. These include, but are not limited to:

Quantiki—a wild accessible on the www at the url:
http://www.quantiki.org/wiki/index.php/Category:Introductory_Tutorials
which includes a number of expositions such as What is Quantum Computation?, and Introduction to Quantum Theory (a very basic introduction to key concepts in quantum theory from a historical perspective.)

Optics Express—A leading journal in optics research, accessible at the url:
http://www.opticsinfobase.org/oe/Issue.cfm Encyclopedia of Laser Physics and Technology, which substantial overlaps with much of, and specifically refers to portions of itself as being focused on, quantum optics, accessible at the url:
http://www.rp-photonics.com/encyclopedia.html Qwiki—a quantum physics wild devoted to providing technical resources for practicing quantum physicists. (synopsis from Wikipedia)

As well as great multitudes of other www sites (particularly those of university research divisions, and including, of course, many journals in the realms of optics, quantum technologies, photonics, and the like, both print and electronic, as well as those with free and paid access policies) devoted to detailing and often teaching considerable breadths of quantum optics research and background (an example of just one web portal that attempts to provide a panoply of such links is titled "Quantum Optics and Atom Optics links" accessible at the url: http://www.quantumoptics.net/). The scope of information available and/or known by those of ordinary skill in the art of quantum information processing, quantum optics, and the like therefore encompasses the gamut of abundant operational techniques, multitudes of theoretical developments, and numerous diverse manners of quantum technology employment.

Among the more frequently pursued approaches to utilizing quantum technologies for information processing are utilizations of quantum entities in superpositions of quantum states to embody and manipulate various representations of information in manners which are either unavailable with the present conventional integrated circuits, impractically slow to process when utilizing entities (electrons) that are solely employed to represent binary states (unlike superpositions of quantum states that can theoretically embody unlimited gradations of partial combinations of states), and/or are unable to process a data representation unless the information that is being represented is already known well enough to construct the representation (unlike a quantum superposition of states that theoretically can accurately represent information even when that information is not explicitly known in an independent exact manner) A second broadly pursued branch of approaches to utilizing quantum technologies for information processing involve the utilization of photons and the quantum properties of their interactions to develop a photonic substitute for electrons' role in integrated circuits (to benefit from various photon properties that avoid issues arising with electrons, such as power consumption, heat production, scale limitations due to quantum effects when integrated circuit elements approach the nanoscale, in addition to expectations of improved processing speed and new capabilities promised by quantum photonic information processing.) The potential benefits of these quantum technologies has not yet been fully realized, nor fully commercialized successfully, though, and hence there remains a need for further advances, including realizations with specific capabilities, in the field.

SUMMARY OF THE INVENTION

The present invention is a continuation-in-part of U.S. non-provisional patent application Ser. No. 10/757,615, and the entire disclosure of both that application and its parent application, U.S. provisional patent application Ser. No. 60/439,712, are hereby incorporated by reference. As a continuation-in-part, substantial portions of the present application also receive at least partial supporting disclosure from these parent applications and a full understanding of the written description, enablement, and support for the present claims should also include consideration of these parent applications. In light of these parent applications, it can be seen that some aspects of the present application are in certain senses effectively extensions of these parent applications. Present invention embodiments sometimes vary in moderate detail only from the parent applications' embodiments, such as those that utilize a beam splitter (which was well known well before the filing of the parent non-provisional '712) as an alternative component to effect the various approaches previously described, said descriptions generally including essentially a beam splitter as well, for realizing interference and/or an interference congener.

Among other aspects, the present invention encompasses systems and methods of processing quantum entity states as a manner of implementing a large variety of applications, including information processing functions such as, but not limited to, quantum computing, quantum communication, and quantum cryptography. Some embodiments of the present invention can utilize "multi-entity" instances of both fermions and bosons for quantum statistics related outcomes to effect various operations, some can utilize "single-entity" instances, and some can utilize both, as has been largely already described in the parent application. The phrases "multi-entity" and "single-entity" are coined herein to bridge discrepancies in how physical entities are defined and/or described by the limitations of the English language, as opposed to the exacting descriptions of pure mathematics. For example, a multitude of bosons, in the right conditions, can form a Bose-Einstein condensate that behaves as a single entity, but is composed of multiple initial constituents. Whether or not this phenomena is considered a "single-entity" or a "multi-entity" is immaterial to its actual existence, which is well known and not in dispute, and in fact reveals more about the inadequacies of the development of everyday language when addressing certain technical details. Similar questions can arise when addressing a "bi-photon" (which can also be termed a two-photon, among other labels) such as result from photon bunching. The important note is that regardless of the manner of description of these phenomena, they are well known and their meaning is clearly understood. Hence, the terminology as used herein is directed towards communicating an understanding of these phenomena and the operations of the present invention, rather than towards fighting semantic battles, since those of skill in the art will readily comprehend the phenomena being described, even when they may object to the manner of expression or phraseology. Analogously, there is at least some degree of disagreement among some researchers on the scope of the meaning of the term "interference," including, for example, whether or not the term also applies to photon bunching. However, it is arguable that photon bunching, like conventional interference, is the outcome of summing the influences of differing contributions to the state at issue, where the differing contributions arise from differing 'paths' through which these contributions are conveyed. (In these circumstances, the term 'path' is utilized in its broadest sense that includes not only differing spatial routes traversed in order to make the contribution, but also can mean, among other things, almost any differing course of events or process that leads to the end resulting contribution.) Varying portions of significant supporting disclosure for the present claims are provided by: the parent application U.S. non-provisional patent application Ser. No. 10/757,615; the prior art at the time of the filing of the parent application; as well as the current state of knowledge as understood by one of ordinary skill in the art of photonics, quantum or linear optics, and related fields.

Differing embodiments of the present invention realize the capabilities of the present invention in varying degrees. Among these embodiments are systems that process quantum entity states. A first quantum entity state processing system comprises a first quantum differentiator for receiving homogeneously influenceable quantum entity initial states, and engendering heterogeneously influenceable quantum entity secondary states that can realize a first form of self-interference congener; a first quantum conditioner for engendering, from the quantum entity secondary states, conditioned quantum entity tertiary states that can at least partially realize a second form of self-interference congener; and a first quantum interferer for engendering the at least partial realizing of at least one of the first and second forms of self-interference congener with the secondary and tertiary states, respectively. A second quantum entity state processing system comprises both the first quantum entity state processing system and a first quantum responder at least partially responsive to at least one of the at least partial realizing of the first and second forms of self-interference congener. A third quantum entity state processing system comprises the first quantum entity state processing system, wherein at least a first quantum entity secondary state characteristic is involved in engendering the heterogeneous influenceability, said first secondary status characteristic being selected from the group consisting of: spatial disposition; temporal disposition; physical parameter incarnation, varieties of the physical parameter incarnation including the first and second physical entities' frequency, wavelength, polarization, magnetic moment, phase, energy, and momentum; amplitude, in at least a first Hilbert space basis, of at least a first eigenstate's contribution to the quantum entity secondary state; and combinations thereof.

A fourth quantum entity state processing system comprises the first quantum entity state processing system, wherein said conditioning involves heterogeneously influencing the quantum entity secondary states. A fifth quantum entity state processing system comprises the first quantum entity state processing system, wherein said conditioning involves affecting at least one quantum entity secondary state characteristic selected from a group consisting of: spatial disposition; temporal disposition; physical parameter incarnation, varieties of the physical parameter incarnation including the first and second physical entities' frequency, wavelength, polarization, magnetic moment, phase, energy, and momentum; amplitudes, in at least a first Hilbert space basis, of at least a first eigenstate's contribution to the quantum entity secondary state; and combinations thereof. A sixth quantum entity state processing system comprises the first quantum entity state processing system, wherein said engendering conditioned quantum entity tertiary states at least partially involves at least one variety of influencing selected from a group consisting of: influencing the quantum state of at least a first quantum entity state differently than the quantum state of at least a second quantum entity state; influencing the amplitude of the quantum state contribution of at least a first eigenstate, in at least a first Hilbert space basis, differently for at least a first quantum entity state than for at least a second quantum entity state; influencing the coherence of the phase relationship of at least first and second quantum entity states; influencing the coherence of the phase relationship of the contribution of at least a first eigenstate, in at least a first Hilbert space basis, to the quantum states of at least first and second quantum entity states; and combinations thereof. A seventh quantum entity state processing system comprises the first quantum entity state processing system, wherein the first quantum conditioner can function in at least two alternative manners including at least a first preserving and a first non-preserving manner so that: quantum entity tertiary states ensuing from the first preserving quantum conditioner can realize the first form of self-interference congener; and quantum entity tertiary states ensuing from the first non-preserving quantum conditioner can not realize the first form of self-interference congener. An eighth quantum entity state processing system comprises the first quantum entity state processing system, wherein at least two of the first quantum conditioner's alternative manners of functioning are exchangeable.

A ninth quantum entity state processing system comprises the first quantum entity state processing system, wherein quantum entity quaternary states ensue from the first quantum interferer which can function in at least two alternative manners including at least a first preserving and a first non-preserving manner so that: at least one of the first and second forms of self-interference congener is at least partially realizable by quantum entity quaternary states ensuing from the first preserving quantum interferer; and at least one of the first and second forms of self-interference congener is not at least partially realizable by quantum entity quaternary states ensuing from the first non-preserving quantum interferer. A tenth quantum entity state processing system comprises the ninth quantum entity state processing system, wherein at least one of the first quantum interferer's alternative manners of functioning can be switched to at least one other of the first quantum interferer's alternative manners of functioning. An eleventh quantum entity state processing system comprises the first quantum entity state processing system, further comprising at least one confined quantum state influencer, that may also be optionally operative. A twelfth quantum entity state processing system comprises the eleventh quantum entity state processing system, wherein the at least one confined quantum state influencer involves at least one quantum state altering component selected from a group consisting of: a quantum phase shifter; a quantum eigenstate responder; a quantum state responder; a quantum state projector; a quantum state discriminator; a quantum state identifier; and combinations thereof. A thirteenth quantum entity state processing system comprises the first quantum entity state processing system, further comprising at least one associative quantum state influencer operative for associating at least one of: at least one of the quantum entity secondary and tertiary states, at least one potential path of at least one of the quantum entity secondary and tertiary states, at least one quantum state altering component, and at least one combination thereof; with at least one of: at least one supplemental quantum entity state, at least one potential path of at least one supplemental quantum entity state, at least one quantum state altering component, and at least one combination thereof. A fourteenth quantum entity state processing system comprises the thirteenth quantum entity state processing system, wherein said quantum state altering component is selected from a group consisting of: a phase shifter; a quantum state responder; a quantum eigenstate responder; a quantum state projector; a quantum state discriminator; a quantum state identifier; and combinations thereof.

A first quantum entity state processing method comprises the steps of: engendering heterogeneously influenceable quantum entity secondary states from homogeneously influenceable quantum entity initial states, wherein a first form of self-interference congener is realizable by the secondary states; engendering conditioned quantum entity tertiary states from at least some of the quantum entity secondary states, wherein a second form of self-interference congener is at least partially realizable by the conditioned tertiary states; and realizing, at least partially, at least one of the first and second forms of self-interference congener with the secondary and tertiary states, respectively. A second quantum entity state processing method comprises the first quantum entity state processing method, further comprising the step of responding, at least partially, to the at least partial realizing of at least one of the first and second forms of self-interference congener. A third quantum entity state processing method comprises the first quantum entity state processing method, wherein said conditioning involves heterogeneously influencing the quantum entity secondary states. A fourth quantum entity state processing method comprises the first quantum entity state processing method, wherein said conditioning can occur in at least two alternative manners including at least a first preserving and a first non-preserving manner so that: quantum entity tertiary states ensuing from the preserving manner conditioning can realize the first form of self-interference congener; and quantum entity tertiary states ensuing from the non-preserving manner conditioning can not realize the first form of self-interference congener. A fifth quantum entity state processing method comprises the first quantum entity state processing method, wherein the realizing of the at least one of the first and second forms of self-interference congener, from which quantum entity quaternary states ensue, can function in at least two alternative manners including at least a first preserving and a first non-preserving manner so that: at least one of the first and second forms of self-interference congener is at least partially realizable by quaternary states ensuing from the preserving manner realizing; and at least one of the first and second forms of self-interference congener is not at least partially realizable by quaternary states ensuing from the non-preserving manner realizing.

A first photon state processing system comprises a differentiating beam splitter adapted for producing, from homogeneously influenceable initial photon states, heterogeneously influenceable secondary photon states that can at least partially realize a first form of self-interference congener; a photon state conditioner adapted for producing, by heterogeneously influencing at least first and second portions of the secondary photon states, conditioned tertiary photon states that can at least partially realize a second form of self-interference congener; a photon state self-interferer adapted for at least partially realizing the first and second forms of self-interference congener when receiving the secondary and conditioned tertiary photon states, respectively; and a photon state distinguisher adapted for distinguishing at least one of first and second quaternary photon states ensuing, respectively, from the photon state self-interferer's at least partial realizations of the first and second forms of self-interference congener. A second photon state processing system comprises the first photon state processing system, further comprises a photon state deconditioner, adapted for producing tertiary photon states that are not conditioned, said photon state deconditioner operative as at least one of an alternative and an auxiliary to the photon state conditioner. A third photon state processing system comprises the first photon state processing system wherein the photon state distinguisher functions in at least one of a preserving and a non-preserving manner such that: at least one of the first and second quaternary photon states ensuing from the photon state self-interferer also ensues from the preserving photon state distinguisher; and at least one of the first and second quaternary photon states ensuing from the photon state self-interferer does not also ensue from the non-preserving photon state distinguisher.

Other objects and features will be in part apparent and in part pointed out hereinafter.

DETAILED DESCRIPTION OF THE PREFERRED EMBODIMENTS

Terms & Phraseology

Figure 1:
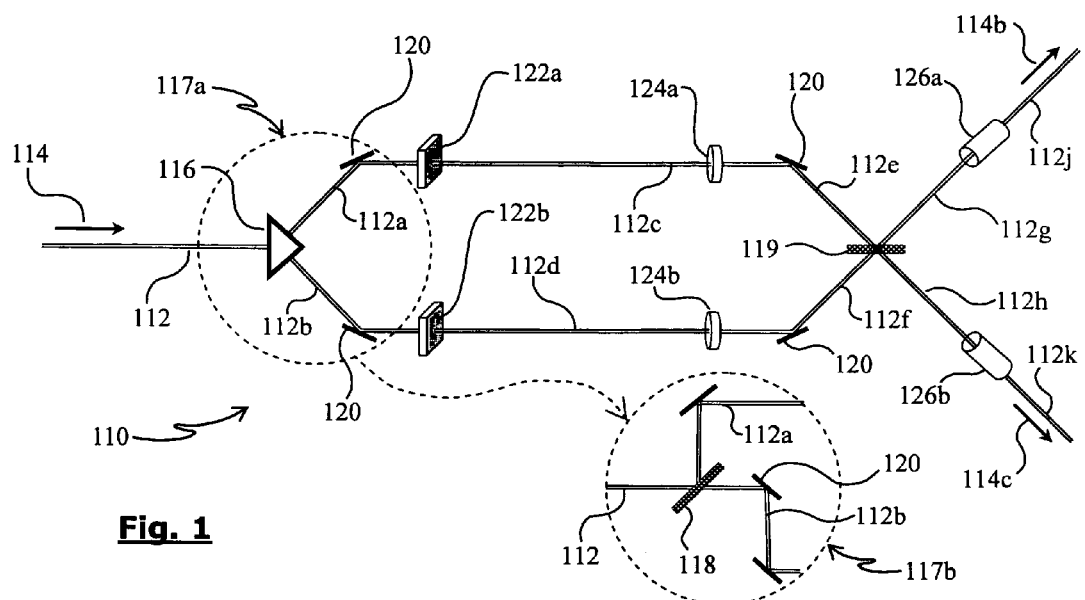
FIG. 1 depicts a first schematic implementation of a first embodiment of the present invention that is capable of realizing some of the processing systems and methods of the present invention.

As is well understood by those of skill in the art, descriptions of quantum entities, their states, and attributes of systems that they interact with can vary in accordance with the formalism utilized. The mathematical interrelationships of these formalisms are well defined, and hence it is will understood how to mathematically translate one formalism's description to another's, but it is also evident that the English language is not as rigorously well defined, at least in regard to these phenomena. Additionally, even within the same formalism, a degree of latitude is usually available for varying how a particular quantum system state, or state of a subdivision of a quantum system, can be characterized; though it should also be understood that the mathematics involved are well defined and understood by those of skill in the art. In order to aid the proper construal of the terms utilized herein, and hence the correct construction of the scope of the present invention, in addition to the standard definition meanings of these terms, the following is a guide to supplemental meanings that are not limiting, but should also be included for consideration when interpreting the terms & phraseology used herein:

a) quantum entity state . . . a state of a quantum entity, which can also apply to a portion of a state of a quantum entity, in accordance with the characterization of the state of that quantum entity, that can further also apply to a "multi-entity" or a "single-entity";

b) quantum differentiator . . . a capability of engendering a quantum attribute differentiation;

c) homogeneously influenceable . . . a capacity of being influenced homogeneously;

d) initial states . . . states present at the inception of a phenomena;

e) heterogeneously influenceable . . . a capacity of being influenced heterogeneously;

f) secondary states . . . states that next succeed initial states;

g) self-interference congener . . . a congener is defined as "something that belongs to the same class, group, or type," and is used herein to refer both to interference, as originally defined in the study of wave mechanics—"The process in which two or more light, sound, or electromagnetic waves of the same frequency combine to reinforce or cancel each other, the amplitude of the resulting wave being equal to the sum of the amplitudes of the combining waves;" as well as to a broader characterization in which at least one portion of at least one (at least hypothetical) entity can affect another to produce in concert phenomena (for example, boson bunching or fermion anti-bunching) that are of the same class, group, or type as wave interference;

h) quantum conditioner . . . a capability of engendering a conditioned status for a quantum entity state;

i) conditioned . . . a status wherein a quantum entity state can realize a form of self-interference;

j) tertiary states . . . states that next succeed secondary states;

k) quantum interferer . . . a capability of engendering at least partial realization of self-interference by conditioned quantum entity states;

l) quantum responder . . . provides capacity to respond to an at least partial realization of self-interference, optionally including responding to a quantum entity state that is the outcome of an at least partial realization of self-interference;

m) physical parameter incarnation . . . an incarnation (i.e. manifestation) of a particular physical parameter (e.g. when the parameter is a photon's polarization, a manifestation can be a horizontal polarization);

n) preserving . . . when applied to an operation or component, ensuing quantum entity states' capacity for at least partially realizing self-interference is present;

o) non-preserving . . . when applied to an operation or component, ensuing quantum entity states' capacity for at least partially realizing self-interference is not present;

p) quaternary states . . . states that next succeed tertiary states;

q) influencer . . . a capability of applying influence to a quantum entity state;

r) confined . . . a quantum state influencer operatively encompassed by a distinguishable embodiment;

s) altering component . . . a component able to alter a quantum entity state;

t) discriminator . . . a capability of discriminating at least one quantum entity state;

u) identifier . . . a capability of identifying at least one quantum entity state;

v) differentiating beam splitter . . . a beam splitter that can differentiate homogeneously influenceable photon states to produce heterogeneously influenceable photon states;

w) photon state conditioner . . . a capability of engendering a conditioned status for a photon state;

x) photon state . . . a quantum state of a photon;

y) photon state self-interferer . . . a capability of engendering at least partial realization of self-interference by conditioned photon states;

z) photon state distinguisher . . . a capability of distinguishing at least one photon state;

aa) photon state deconditioner . . . a capability of arresting the conditioned status of a photon state.

In the following description, identical numbers indicate identical elements. Where an element has been described in one Figure, and is unaltered in detail or relation in any other Figure, said element description applies to all FIGUREs. Additionally, parts that are essentially identical repetitions of earlier described parts are separately indicated by differing letter appellations that are adjoined to the same part number as the earlier description (such as X12, X12a, X12b, etc.) and the description of one essentially applies to all, generally other than extrinsic differences such as spatial disposition. Moreover, the part numbers of the present description are related between drawings by a part's last two digits, where a part in one FIGURE is an essentially identical repetition of a part described in an earlier FIGURE, that part in the later FIGURE will also be designated by the same last two digits (such as X12 and Y12) and the description of one essentially applies to the other, generally other than extrinsic differences such as spatial disposition.

The first embodiment 110 of the present invention depicted in FIG. 1 comprises an input pathway 112 for at least one homogeneously influenceable initial state quantum entity (such as a photon) progressing in the direction 114. A quantum differentiator 116 (such as a half-silvered mirror, or a birefringent prism functioning as a polarizing beam splitter) engenders secondary states, that are heterogeneously influenceable, for the quantum entities. The heterogeneous influenceabilities of the secondary states can involve a substantial variety of forms of influencing including, for example, the spatial separation between the paths 112a and 112b providing options of influencing each pathway differently; a polarization direction difference such as horizontally polarized photons traversing path 112a and vertically polarized photons traversing path 112b providing options of influencing either and/or both according to polarization direction; and/or a magnetic dipole moment disposition difference such as when the quantum entities are electrons and the quantum differentiator 116 is an appropriately directed local magnetic field region providing options of influencing differently according to magnetic moment disposition. Although the schematic depiction style of FIGS. 1-4 is most commonly associated with photons serving as the quantum entities, (and though such a manner of realization is envisioned as at least one of the principal modes of realizing the present invention,) it should be noted that the pathways shown in FIGS. 1-4 are all depicted only schematically to emphasize the wide variety of manners of realization of various embodiments of the present invention, including those that utilize either or both bosons and fermions as their respective quantum entities. This depiction style utilizes pathways such as input pathway 112 whose manner of illustration is frequently used to represent an optical fiber or a representation of a narrowly spread, though unconfined pathway whose direction is changed by the completely reflecting mirror(s) 120. These mirrors 120 can be optionally constructed as phase altering or non-phrase altering and such variability can be further incorporated into processing realizations of the present invention much like they can be incorporated into realizations of the embodiments of the present invention's parent application U.S. non-provisional application Ser. No. 10/757,615; which also discusses various utilizations of these differences in mirror types.

Recurrently, it will be preferable that the quantum differentiator 116 is at least optionally phase coherence maintaining in the sense that the secondary state quantum entity states engendered by the quantum differentiator 116 have a largely coherent relationship between the portions of the state traversing pathways 112a and 112b, particularly when that phase coherence is germane to the quantum entity states capability of realizing the first form of self-interference congener. In a number of other cases the quantum differentiator 116 will preferably maintain the relationship, in terms of at least one other attribute germane to the first form of self-interference congener, between the portions of the quantum entity state traversing pathways 112a and 112b. A first bi-photon embodiment (wherein the initial quantum entity state is a bi-photon, also sometimes referred to as a dual-photon or a 2-photon, or alternatively described as a photon Fock state with n=2, and the first form of self-interference congener is photon bunching) of the present invention presents an example of such an other attribute: the indistinguishability of photons traversing pathway 112a from photons traversing pathway 112b. The applicable secondary state involves these indistinguishable separate photons (engendered by the quantum differentiator 116 from the initial state bi-photon) traversing pathways 112a and 112b, so that in the bi-photon embodiment the quantum differentiator 116 would preferably not effect a distinguishment between the secondary state photons, such as could occur if it were a birefringent crystal rather than a symmetrical half-silvered mirror, for example. The contents of the area of FIG. 1 surrounded by dashed circle 117a are exchangeable, in some embodiments, for the contents of dashed circle 117b. The most notable divergence between the contents of the dashed circles 117a and 117b is the replacement of the quantum differentiator 116 by quantum differentiator 118 (wherein quantum differentiator 116 is illustrated so as to connote at least one engendered attribute differentiation beyond spatial separation between the pathways 112a and 112b while quantum differentiator 118 is illustrated so as to connote only a spatial engendered attribute differentiation between pathways 112a and 112b. A polarizing beam splitter is one instance of a potential realization of the quantum differentiator 116, while a partially silvered mirror is one instance of a potential realization of quantum differentiator 118. Hence in the bi-photon embodiment, for example, the contents of the dashed circle 117a would be substituted for the contents of dashed circle 117a.

The paths 112a and 112b traverse quantum entity state altering components 122a and 122b, respectively, and are subsequently designated as paths 112c and 112d, respectively. The paths 112c and 112d traverse quantum entity state detectors 124a and 124b, respectively, and are subsequently designated as paths 112e and 112f, respectively. While the first embodiment 110 is depicted as including both quantum entity state altering components 122a and 122b, as well as both quantum entity state detectors 124a and 124b, it should be also understood that a multitude of variants of the first embodiment 110 are also within the scope of the present invention, including variants that lack at least one of these altering components and/or detectors; in addition to variants that include more than one of these altering components and/or detectors arrayed along at least one of the paths 112a, 112b, 112c, 112d, 112e, and 112f. Numerous varieties of the altering components and detectors fall within the scope of the present invention, including a multiplicity of well known types of altering components, as well as a range of detector types (including, for example, quantum entity state responders, quantum entity state discriminators, quantum entity state identifiers, and quantum entity state distinguishers,) plus options for preserving or non-preserving operation, as well as capabilities of switching between preserving and non-preserving operation, of at least one of the altering components and/or detectors. Not only are the altering components capable of serving as at least one of the quantum influencers, but the detectors can as well, since merely detecting an aspect of a quantum entity state can affect that state. Moreover, it should be understood that any of the altering components, detectors, and/or quantum influencers in general are also capable of being utilized in optionally operative modes, including an optional inoperative mode that involves the altering component, detector, and/or quantum influencer lacking the capacity to affect the quantum entity state even in principle, so that an altering component, detector, and/or quantum influencer, when inoperative, can be present without affecting any quantum entity state that could traverse it. Furthermore, it is also necessary to appreciate that these manners of constituting differing embodiment variants such as those described above for the first embodiment 110 are also at least partially applicable to almost all of the other embodiments of the present invention, and the scope of the present invention encompasses all of these potential variants as well as the specific variant instances of the embodiments described herein.

The paths 112e and 112f intersect at quantum interferer 119 and emerge as paths 112g and 112h. A beam splitter is consistent with the depiction of the quantum interferer 119 and can be utilized in the first embodiment 110. By varying the characteristics of the quantum interferer 119, various manners of operational capabilities are providable, such as by utilizing a symmetrical half-silvered mirror to provide a photon-bunching capability when separate indistinguishable photons are proceeding on paths 112e and 112f or by utilizing an unsymmetrical (with differences in induced phase shift between reflection from one side vs. reflection from the other) half-silvered mirror and a superposition state wherein a single photon's wave function has equal probability amplitudes of $1/\sqrt{2}$ of proceeding on paths 112e and 112f. The paths 112g and 112h proceed through quantum responders 126a and 126b (which are also multi-variable in form and sensitivity) and can also be able to further proceed on paths 112j and 112k in the respective directions 114b and 114c and can then be routed for other, including networked, processing. It is also an envisioned variant of the first embodiment 110 that at least one of the quantum responders 126a and 126b are optionally absent, and that either or both can be restricted to preserving non-preserving operation or a mixed pair of preserving and non-preserving operation, or that at least one can be capable of being switchable from preserving to non-preserving, or vice versa, operation.

Figure 2:
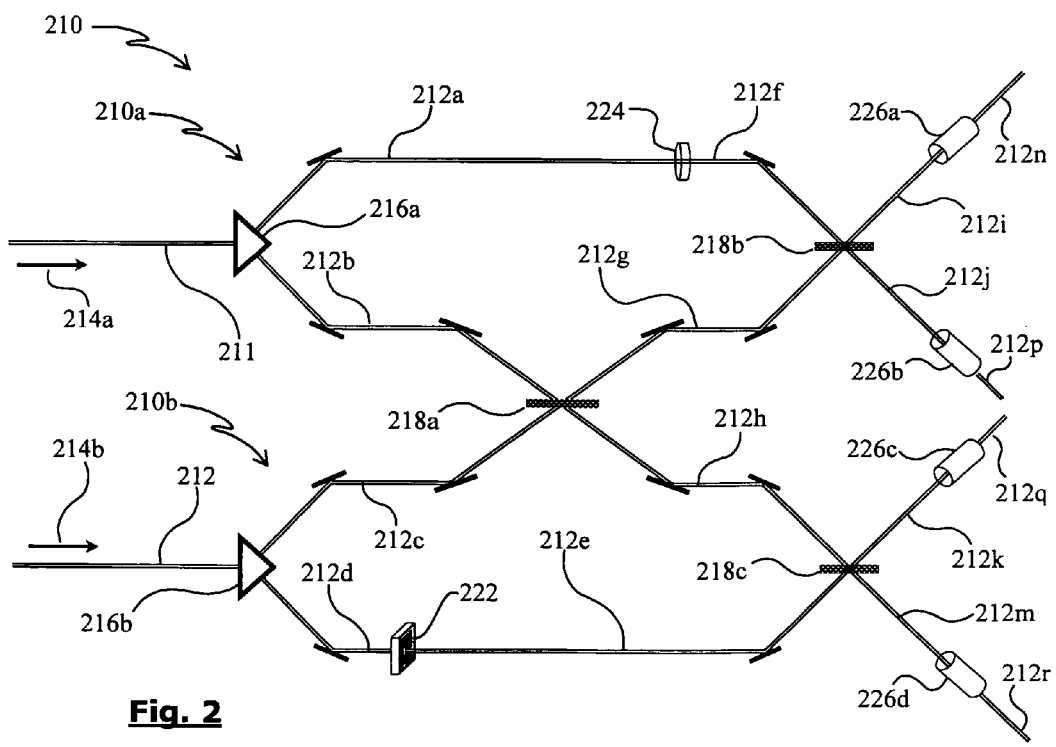
FIG. 2 depicts a first schematic implementation of a second embodiment of the present invention that is capable of realizing some of the processing systems and methods of the present invention including a first form of associative quantum state influencer.

A second embodiment 210 of the present invention depicted in FIG. 2 includes first and second sub-systems 210a and 210b that interact via an associative quantum influencing action. Each of the first and second sub-systems 210a and 210b can be considered to be comparable, with limited divergences, to the first embodiment 110. Each of the numbered parts of the second embodiment 210 correspond to the numbered parts of the first embodiment 110 that end in the same two numerals as the part in the second embodiment 210 (with repetitions of essentially identically depicted parts differentiated by the inclusion of lower case letters appended to the part number). One of these divergences from the first embodiment 110 of the first and second sub-systems 210a and 210b involves their capabilities of interaction via the associative quantum influencer 218a. Another of these divergences involves the incorporation of reduced numbers (by comparison to the first embodiment 110) of quantum entity state altering components and quantum entity state detectors in the first and second sub-systems 210a and 210b. As depicted in FIG. 2, the first sub-system 210a includes a single quantum entity state altering component 224 and the second sub-system 210b includes a single quantum entity state detector 222. It should also be understood that the full range of differing manners of constituting the variants of the first embodiment 110 described previously also apply to either or both of the first and second sub-systems 210a and 210b, with these differently constituted variants of the first and second sub-systems 210a and 210b comprising variants of the second embodiment 210 when the associative quantum influencer 218a is also present.

Additional variants of the second embodiment 210 can also incorporate a plurality (not shown) of associative quantum influencers 218a, as well as differing manners of incorporation of quantum influencers 218a (for example disposing at least one quantum influencer 218a along a differing path of either or both of the first and second sub-systems 210a and 210b.) The incorporation of the associative quantum influencer 218a provides additional processing capabilities wherein the outcome of one or the other of the first and second sub-systems 210a and 210b is affectible by operations of the other sub-system, as well as by the operations of itself. At least one of the quantum responders 226a, 226b, 226c, and 226d can provide a response to these outcomes such as by registering a specific response (like when the quantum responder 226a detects a photon on path 212i) or registering a lack of a specific response. Registration of a given outcome can encompass a broad gamut of potential effects, including direct and indirect registrations, but generally will involve an action that produces a record of the registering, and hence will induce certain well known quantum effects where applicable. A first potential consequence of whether or not the quantum responder 226a produces a record of a photon traversing path 212i is an example of one such well known registering effect. For a first variant of the second embodiment 210 wherein a suitably arranged photon state enters along paths 211 and 212 in the directions 214a and 214b, respectively, the outcome photon state may have non-zero probability amplitudes along the path 212i as well as along at least one other of the paths 212j, 212k, and 212m (prior to any registering of a photon by any of the quantum responders 226b, 226c, 226d.) If the entering photon state has a Fock state with n=1, then the registering of a photon by quantum responder 226a entails that the probability of registering a photon with any of the other quantum responders 226b, 226c, 226d is equal to zero. However, when the quantum responders 226a, 226b, 226c, and 226d do not register the photon by making an immediate record, such as by utilizing a delayed choice operation, and when the quantum responders 226b, 226c, and 226d include post-quantum responder outcome paths (not shown) such as paths 112j and 112k, there remains a non-zero probability amplitude that the photon can be on more than one of the final paths. By contrast, if the photon is immediately registered by the quantum responders 226a, 226b, 226c, and 226d, then there is only one of the final outcome paths that the photon can be on, and hence the available outcome options are altered by the manner of operation of the quantum responders 226a, 226b, 226c, and 226d.

In a second variant (not shown) of the second embodiment 210, the quantum responder 226b is absent. The travel time for a photon to traverse the distance along path 212i between the quantum interferer 218b and the quantum responder 226a is arranged to be of sufficient extent for a photon traversing path 212*j* and/or 212*p* (which are essentially the same in this variant) to be further utilizable (for example as an input source for another instance of an embodiment of the present invention) before quantum responder 226*a* resisters the photon traversing path 212*i*. The record produced by the registering of a photon by quantum responder 226*a* can then be affected by not just the attributes, configuration, and quantum entity state circumstances of the system itself, but also can be affected by the attributes, configuration, and quantum entity state circumstances of a subsequent system that, for example, receives the photons that emerge from path 212*p* as input photon states. Well understood principles of linear optics, quantum optics, and photonics are employed, when employing photon states, to enable the outcomes of the second embodiment 210 and its variants, as well as most of the other variants of the present invention, to be knowable or knowably limited, or at least predictable, or predictably limited, in accordance with the specific options utilized in a particular processing event.

The interlinking of the sub-systems 210*a* and 210*b* through the associative quantum influencer 218*a* enables the outcome photon probability along one sub-system's output paths to be affected by aspects of the other sub-system is the first mode of associative quantum influence. For example, when one of the outcome paths 212*i* and 212*j* from quantum interferer 218*b* is conditionally always populated (or conditionally always not populated) when the suitably self-interfering quantum entity state traverses paths 212*f* and 212*g*, and the presence of the suitably self-interfering quantum entity state is at least partially influenceable by aspects of the second sub-system 210*b*. The further utilization of photons traversing at least one of the outcome paths 212*n*, 212*p*, 212*q*, and 212*r* of the second embodiment 210 or one of its variants, in a subsequent system is a second mode of associative quantum influence, with the subsequent system being characterizable as a quantum influencer of the first system (and perhaps vice versa also.) This second mode of associative quantum influence is widely applicable to many of the embodiments of the present invention, including for interrelating more than two embodiments as well as interrelating differing embodiments in a plurality of permutations. Delayed choice enactments, or protocols, including selective and/or differential implementations, are widely applicable to many of the elements and operations of a substantial proportion of the embodiments of the present invention. A variety of well known techniques to selectively control enactment of a particular operation, such as the aforementioned extended paths in addition to delayed choice protocols, enable many of the processing operations of the embodiments of the present invention to be further interrelatable, including sequentially and/or concomitantly, as well as temporally shiftable in enactment and/or operativity.

Figure 3:
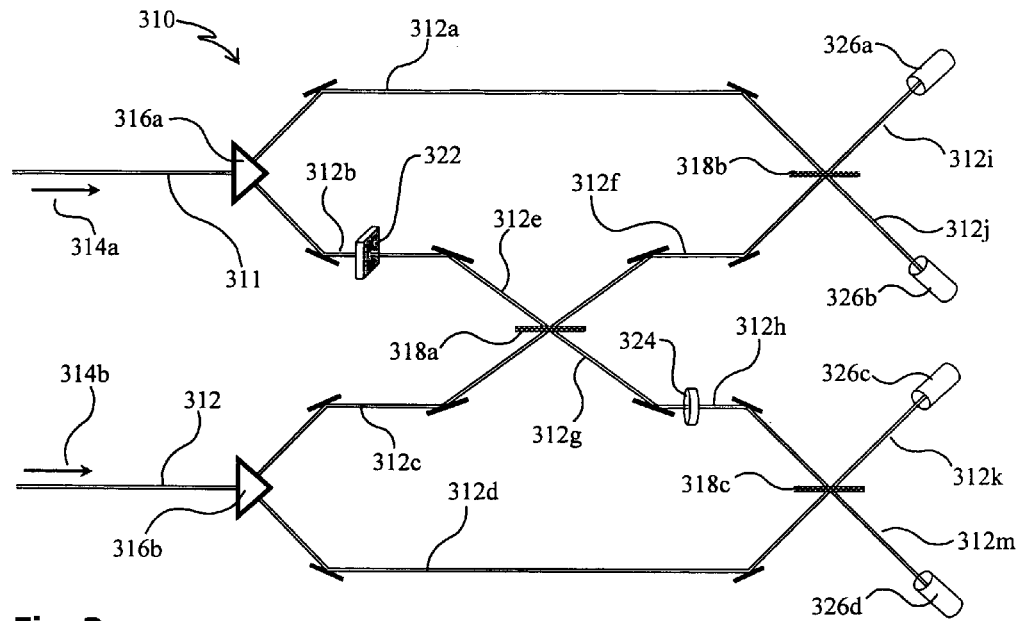
FIG. 3 depicts a first schematic implementation of a third embodiment of the present invention that is capable of realizing some of the processing systems and methods of the present invention including a second form of associative quantum state influencer.

A third variant 310 of the second embodiment 210 of the present invention depicted in FIG. 3 provides a representative demonstration of the extensive range of capabilities provided by the diversity of embodiments (including their variants) that fall within the scope of the present invention. The third variant 310 is well suited to providing an exposition of how broad this range is, particularly when the limited differences between the second embodiment 210 and the third variant 310 are explicated. The primary configuration differences involve a substitution of the quantum entity state altering component 322 between paths 312*b* and 312*e* for the quantum entity state altering component 222 between paths 212*d* and 212*e*, and a substitution of the quantum entity state detector 324 between paths 312*g* and 312*h* for the quantum entity state detector 222 between paths 212*a* and 212*f*. Consequently, the impacts of the quantum entity state altering component 322 and/or the quantum entity state detector 324 on the operations of the third variant 310 are substantially modifiable from the impacts of the quantum entity state altering component 222 and/or the quantum entity state detector 224 on the operations of the second embodiment 210, when appropriate quantum entity states are utilized. An exemplary comparison will delineate some of these capabilities' available modifications.

Consider the case wherein the quantum entity states utilized are linearly polarized photons, defined in terms of the H, V basis (a 2-dimensional Hilbert space with horizontally and vertically polarized photons constituting the orthogonal basis vectors.) Turning first to the second embodiment 210, before comparison to the third variant 310, further postulate that identical bi-photons, both in the state (|H⟩+|V⟩) and essentially synchronized and in phase coherence with each other, traverse paths 211 and 212 in the directions 214*a* and 214*b*, where they encounter quantum differentiators 216*a* and 216*b* which are identical polarizing beam splitters (such as appropriately aligned birefringent crystals) which direct horizontally aligned photon states along paths 212*a* and 212*c*, and direct vertically aligned photon states along path 212*b* and 212*d*. Assume next that associative quantum influencer 218*a* is a symmetrical 50/50 beam splitter, such as a half-silvered mirror with identical phase shifting sides; and that the photon states then traversing the paths 212*g* and 212*h* are then composites of both |H⟩ and |V⟩ basis vectors. These photons will hence not produce clean two-photon bunching results in quantum responders 226*a* and 226*b* (said bunching results being the well-known observation that two indistinguishable photons that both enter a symmetrical beam splitter will, when the appropriate execution occurs, always exhibit that if two photons are responded to, then they either both take path 212*i* or both take path 212*j*, but they never exhibit that one takes path 212*i* and one takes path 212*j*,) unless the action of quantum entity state detector 224 can produce a non-zero probability that a photon can traverse path 212*f* that is indistinguishable from a photon that can traverse path 212*g*. For example, when quantum entity state detector 224 is configured to detect horizontally polarized photons, even non-destructively, it will project all the photons passing it into eigenstates of either horizontal or vertical linear polarization, and such photons cannot exhibit bunching with photon states that include both non-zero horizontal and vertical polarization vectors. Conversely, by configuring the quantum entity state detector 224 to project the photons traversing path 212*a* onto the (|H⟩+|V⟩) )(|H⟩−|V⟩⊗) basis, those photons traversing path 212*a* that are thereby projected onto the state $1/\sqrt{2}$ (|H⟩+|V⟩) will then realize photon bunching when interfered with the photons traversing path 212*g* at the quantum interferer 218*b*, when the other well-known necessary conditions for photon bunching are realized as well. The photons that realize photon bunching thusly can be readily identified with at least some of the quantum responders 226*a-d*, and/or the quantum entity state detector 224, which can also be configured to register which particular photons traversing it are projected onto the $1/\sqrt{2}$ (|H⟩+|V⟩) state. Thus, a predictable, though probabilistic, result is effectible by selecting to appropriately configure and make operative the quantum entity state detector 224. Furthermore, since the quantum responders 126*a* and 126*b* can be arranged to operate non-destructively as well as in a preserving mode, the bunched photons (identified as described immediately above) can be passed on along at least one of paths 212*n* and 212*p*, and utilized for additional processing, including interrelated system processing. By employing a series of repeating photon states and configuration such as described above, a significant number of photons will still be available for further employment after traversing the quantum responders 226a-d. Analogous processing control of photon bunching at quantum interferer 218c is effectible by utilization of quantum entity state altering component 222, although the difference in nature of the quantum entity state altering component 222 from the quantum entity state detector alters the forms and approaches utilized to realize a quantum interference congener at quantum interferer 218c.

To illustrate, consider next the case wherein the quantum entity states utilized are still linearly polarized photons, defined in terms of the H and V basis, and additionally postulate now that identical single photons, both in the state $1/\sqrt{2}(|H\rangle +|V\rangle )$ and essentially synchronized and in phase coherence with each other, traverse paths 211 and 212 in the directions 214a and 214b. They again encounter identical polarizing beam splitters (such as appropriately aligned birefringent crystals) functioning as the quantum differentiators 216a and 216b in directing horizontally aligned photon states along paths 212a and 212c and vertically aligned photon states along path 212b and 212d. Following associative quantum influencer 218a (once again the symmetrical 50/50 beam splitter), the photon state traversing path 212h is characterizable as: $1/\sqrt{2}(|H\rangle +i|V\rangle )$ and the quantum entity state altering component 222 can be an arrangement of quarter and half wave plates that shift the $1/\sqrt{2}|V\rangle$ polarization of the photons traversing path 212d to the same polarization of $1/\sqrt{2}(|H\rangle +i|V\rangle )$. Hence, by selecting an appropriate 50/50 unsymmetrical (wherein the phase shift induced upon reflection from one side differs from the phase shift induced by reflection from the other side) half-silvered mirror as quantum interferer 218c, the interference congener can be controlled so that the outcome photons traverse only one of the paths 212k and 212m. A significant feature of many of the operations of the second embodiment 210, and its variants, is that the direct impact of either the quantum entity state detector 224 or the quantum entity state altering component 222 (because they are disposed along paths that do not traverse the associative quantum influencer 218a) predominantly affects the outcome paths of one or the other, but seldom both, of the quantum entity state interferers 218b and 218c.

By comparison, in the third variant 310, quantum entity state altering component 322 is disposed along a path that is traversed by photons that also traverse associative quantum influencer 318a; and hence the quantum entity state altering component 322 is capable of directly impacting the photons that traverse the outcome paths 312i, 312j, 312k, and 312m of either or both of the quantum entity state interferers 218b and 218c. For example, apply the set of circumstances of the case described in the above paragraph [0033] to the present case of the third variant 310, and focus on the effects of the quantum entity state altering component 322 and how these effects differ from those of the quantum entity state altering component 222. For the third variant 310, all of the photons that traverse paths 312f and 312g are at least partially influenceable by the effects of the quantum entity state altering component 322. In addition, all of the third variant 310 final outcome photons that traverse any of the paths 312i, 312j, 312k, and 312m are at least partially influenceable by the photons that traverse at least one of the paths 312f and 312g, and hence all of these final outcome photons are directly influenceable by the quantum entity state altering component 322. The quantum entity state detector 324 is disposed so that the photons that traverse it have already traversed the associative quantum influencer 318a, unlike the photons that traverse the quantum entity state altering component 322 since they have not yet traversed the associative quantum influencer 318a. Due to being disposed following the associative quantum influencer 318a, the quantum entity state detector 324 can most directly influence the responses of the quantum responders 326c and 326d, and, less directly, by coincidence measurement protocols, can influence the results of all of the quantum responders 326a-d. The disposition of the quantum entity state detector 324 along the paths that do traverse the associative quantum influencer 318a, however, allows it to exercise this coincidence form of influence with lesser pre-arrangements of the related characteristics of the photons that traverse paths 311 and 312 than is entailed to accomplish the same sort of influence by quantum entity state detector 224 upon the quantum responders 226a-d. Of course, in regard to either or both of the quantum entity state altering component 322 and the quantum entity state detector 324, other variants of the second embodiment 210 can incorporate variations in their dispositions, their numbers, and the number and disposition of the paths that they adjoin, including dispositions both preceding and following the associative quantum influencer 318a.

Figure 4:
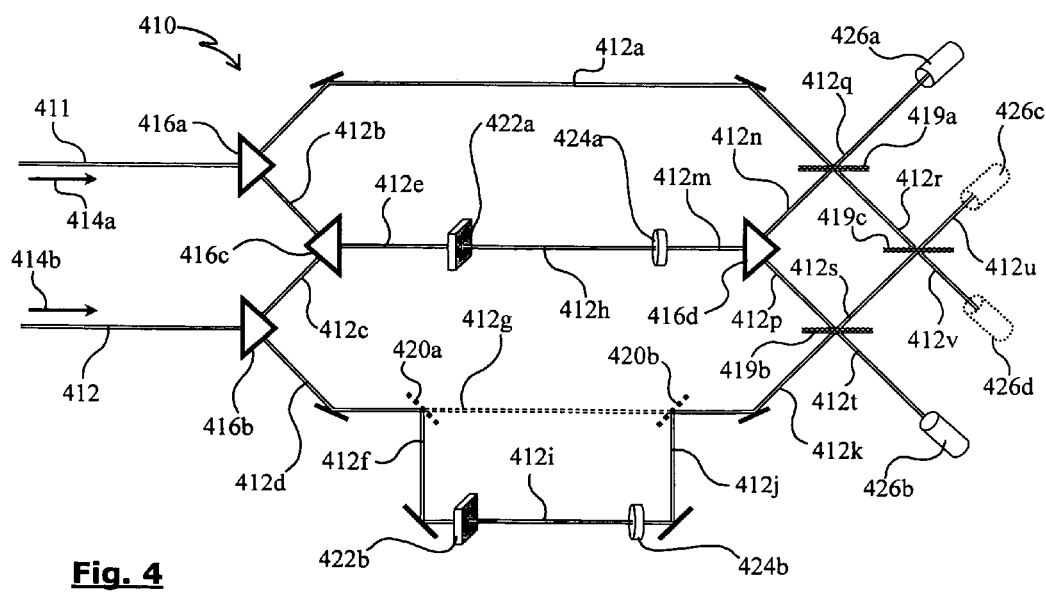
FIG. 4 depicts a first schematic implementation of a fourth embodiment of the present invention that is capable of realizing some of the processing systems and methods of the present invention including a third form of associative quantum state influencer.

A third embodiment 410 depicted in FIG. 4 is organized to further explicate the broad range of configuration variations encompassed by the present invention. Not all of the configuration options detailed in the third embodiment 410 are necessarily preferable in every use, although in certain situations even more configurational complexity may be preferable. The complete range of potential configuration varieties is practically unlimited, and hence will not be individually explicated herein, nor will the full range of potential uses, since each of the innumerable configurations can further have a plurality of uses. The third embodiment 410 does provide a representative illustration (in concert with the other embodiments and their variants both described herein and well understood by those of skill in the art to be included within the present descriptions) of the types of variations encompassed by the scope of the present invention.

One of the key features of the third embodiment 410 is the shared path 412e-412h-412m. This path is termed "shared" because at least a portion of any of the photons that traverse either of the input paths 411 or 412 may also traverse this shared path. Hence the attributes of the photon states that traverse paths 412b and 412c (in concert with these attributes' relations with the associative quantum influencer 416c, including relations that may vary between differing attributes) can affect aspects of the operations of the third embodiment 410. One example of such an operation aspect can be variations in the relationship of the outcome states to the input states, such as a form of a conditionally alterable logic gate. In a conventional logic gate, utilized in conventional information processors, the gate is essentially always operational in a single manner, such as a AND gate or as a NOR gate. By contrast, a conditionally alterable logic gate, realizable by some embodiments of the present invention, can be arranged to operate differently in correlation with differences in the input states. Such a conditionally alterable logic gate can therefore be an OR gate in certain situations, and an AND gate in other situations, and since these differences are predictable, variations in the processing operations can be effected both by alterations in the arrangement of the quantum entity state processing system as well as by alterations in the chosen attributes of the input quantum entity states. The shared path 412e-412h-412m, as shown, traverses one quantum entity state altering component 422a and one quantum entity state detector 424a to provide capabilities of simultaneously inducing quantum entity state influences upon input quantum entity states that enter the third embodiment 410 by both of the input paths 411 and 412. Also within the scope of the present invention are additional alternative embodiments, not shown, that can include more than one quantum entity state altering component 422a and/or more than one quantum entity state detector 424a that are also traversed by the shared path 412e-412h-412m as well as those that entirely omit either or both.

A second of the key features of the third embodiment 310 is an optional path 412f-412i-412j that photons traversing path 412d can be directed to traverse rather than traversing path 412g. The 412d traversing photons are optionally directed on to path 412f by optionally operative mirrors 420a and 420b. The optional operativity of the mirrors 420a and 420b can be effected in a variety of manners, for example by micromechanical mirrors such as are utilized in DLP chips developed by Texas Instruments Inc. for television image creation, as well as by a multitude of other means that are well understood to be applicable by those of skill in the art. The optional path 412f-412i-412j, as shown, traverses one quantum entity state altering component 422b and one quantum entity state detector 424b. Also within the scope of the present invention are additional alternative embodiments, not shown, that can include more than one quantum entity state altering component 422b and/or more than one quantum entity state detector 424b that are also traversed by the shared path 412e-412h-412m as well as those that entirely omit either. The inclusion of the optional path 412f-412i-412j is representative example of a third embodiment 410 feature that allows the third embodiment 410 to treat at least a portion of the photon states that input along path 412 differently than at least a portion of the photon states that input along path 411 are treated, whereas the portions of the input photon states that traverse the shared path 412e-412h-412m are treated the same regardless of their input path. It is also within the scope of the present invention for the path 412a to also include an optional path (not shown) similar to and as potentially varied as the optional path 412f-412i-412j. Additionally, it is further within the scope of the present invention that an optional path branching from path 412a (not shown) can include differences from the optional path 412f-412i-412j as varied as differing numbers, differing settings of, and differing degrees of operativity of at least one of the altering components and or detectors traversed.

A third key feature of the third embodiment 410 is the inclusion of arrangements of the quantum interferers 419a, 419b, and 419c. Other than the difference in their outcome paths, a quantum differentiator 416d capacitates, but does not necessitate, further differentiation between photons that traverse path 412n and photons that traverse path 412p. Hence, even if the photons that traverse path 412a and path 412k are otherwise identical, the outcomes of quantum interferers 419a and 419b can be differentiated by realizing the further differentiation between the photons that traverse path 412n and the photons that traverse path 412p. Likewise, the potential differences between the photons traversing paths 412n and 412p can provide additional variations in the outcomes of quantum interferers 419a and 419b. The portions of these potential outcome variations that traverse paths 412r and 412s are further interferable at quantum interferer 419c, with the concomitant expansion of potential outcome results traversing paths 412u and 412v, which can then be registered by optional quantum responders 426c and 426d, allowed to progress on to additional aspects (not shown) of the third embodiment 410, or to function as inputs and/or contributing aspects (such as operating as a quantum influencer) of at least one associated further embodiment of the present invention. Of course, it is also within the scope of the present invention for basically any of the variations described herein to also be utilized in variants of the third embodiment 410 including, for example, disposing quantum entity state altering components and/or quantum entity state detectors along one or more of the paths 412a, 412n, 412p, 412k, 412r, and 412s.

In view of the above, it will be seen that the various objects and features of the invention are achieved and other advantageous results obtained. The examples contained herein are merely illustrative and are not intended in a limiting sense.

What is claimed is:

1. A quantum entity state processing system comprising:
    a first quantum differentiator for receiving homogeneously influenceable quantum entity initial states, and engendering heterogeneously influenceable quantum entity secondary states that can realize a first form of self-interference congener;
    a first quantum conditioner for engendering, from the quantum entity secondary states, conditioned quantum entity tertiary states that can at least partially realize a second form of self-interference congener; and
    a first quantum interferer for engendering the at least partial realizing of at least one of the first and second forms of self-interference congener with the secondary and tertiary states, respectively.

2. A quantum entity state processing system according to claim 1, further comprising a first quantum responder at least partially responsive to at least one of the at least partial realizing of the first and second forms of self-interference congener.

3. A quantum entity state processing system according to claim 1, wherein at least a first quantum entity secondary state characteristic is involved in engendering the heterogeneous influenceability, said first secondary state characteristic being selected from the group consisting of:
    a) spatial disposition;
    b) temporal disposition;
    c) physical parameter incarnation, varieties of said physical parameter include the first or second physical entities' frequency, wavelength, polarization, magnetic moment, phase, energy, and momentum;
    d) amplitude, in at least a first Hilbert space basis, of at least a first eigenstate's contribution to the quantum entity secondary state;
    e) and combinations thereof.

4. A quantum state-entity processing system according to claim 1, wherein said engendering conditioned quantum entity tertiary states involves heterogeneously influencing the quantum entity secondary states.

5. A quantum entity state processing system according to claim 1, wherein said engendering conditioned quantum entity tertiary states involves affecting at least one quantum entity secondary state characteristic selected from a group consisting of:
    a) spatial disposition;
    b) temporal disposition;
    c) physical parameter incarnation, varieties of the physical parameter include the first or second physical entities' frequency, wavelength, polarization, magnetic moment, phase, energy, and momentum;
    d) amplitudes, in at least a first Hilbert space basis, of at least a first eigenstate's contribution to the quantum entity secondary state;
    e) and combinations thereof.

6. A quantum entity state processing system according to claim 1, wherein said engendering conditioned quantum entity tertiary states at least partially involves at least one variety of influencing selected from a group consisting of:

a) influencing the quantum state of at least a first quantum entity state differently than the quantum state of at least a second quantum entity state;
b) influencing the amplitude of the quantum state contribution of at least a first eigenstate, in at least a first Hilbert space basis, differently for at least a first quantum entity state than for at least a second quantum entity state;
c) influencing the coherence of the phase relationship of at least first and second quantum entity states;
d) influencing the coherence of the phase relationship of the contribution of at least a first eigenstate, in at least a first Hilbert space basis, to the quantum states of at least first and second quantum entity states;
e) and combinations thereof.

7. A quantum entity state processing system according to claim 1, wherein the first quantum conditioner can function in at least two alternative manners including at least a first preserving and a first non-preserving manner so that,
quantum entity tertiary states ensuing from the first preserving quantum conditioner can realize the first form of self-interference congener, and
quantum entity tertiary states ensuing from the first non-preserving quantum conditioner can not realize the first form of self-interference congener.

8. A quantum entity state processing system according to claim 7, wherein at least two of the first quantum conditioner's alternative manners of functioning are exchangeable.

9. A quantum entity state processing system according to claim 1, wherein quantum entity quaternary states ensue from the first quantum interferer which can function in at least two alternative manners including at least a first preserving and a first non-preserving manner so that,
at least one of the first and second forms of self-interference congener s at least partially realizable by quantum entity quaternary states when ensuing from the first quantum interferer functioning in the at least a first preserving manner, and
at least one of the first and second forms of self-interference congener is not at least partially realizable by quantum entity quaternary states when ensuing from the first quantum interferer functioning in the at least a first non-preserving manner.

10. A quantum entity state processing system according to claim 9, wherein at least one of the first quantum interferer's alternative manners of functioning can be switched to at least one other of the first quantum interferer's alternative manners of functioning.

11. A quantum entity state processing system according to claim 1, further comprising at least one optionally operative confined quantum state influencer.

12. A quantum state-entity processing system according to claim 11, wherein the at least one confined quantum state influencer involves at least one quantum state altering component selected from a group consisting of:
a) a quantum phase shifter;
b) a quantum eigenstate responder;
c) a quantum state responder;
d) a quantum state projector;
e) a quantum state discriminator;
f) a quantum state identifier;
g) and combinations thereof.

13. A quantum entity state processing system according to claim 1, further comprising at least one associative quantum state influencer operative for associating at least one of:
a) at least one of the quantum entity secondary and tertiary states,
b) at least one potential path of at least one of the quantum entity secondary and tertiary states,
c) at least one quantum state altering component, and
d) at least one combination thereof;
with at least one of:
e) at least one supplemental quantum entity state,
f) at least one potential path of at least one supplemental quantum entity state,
g) at least one quantum state altering component, and
h) at least one combination thereof.

14. A quantum entity state processing system according to claim 13, wherein said quantum state altering component is selected from a group consisting of:
a) a phase shifter;
b) a quantum state responder;
c) a quantum e genstate responder;
d) a quantum state projector;
e) a quantum state discriminator;
f) a quantum state identifier;
g) and combinations thereof.

15. A method of processing quantum entity states comprising the steps of:
engendering heterogeneously influenceable quantum entity secondary states from homogeneously influenceable quantum entity initial states, wherein a first form of self-interference congener is realizable by the secondary states;
engendering conditioned quantum entity tertiary states from at least some of the quantum entity secondary states, wherein a second form of self-interference congener s at least partially realizable by the conditioned tertiary states; and
realizing, at least partially, at least one of the first and second forms of self-interference congener with the secondary and tertiary states, respectively.

16. A method of processing quantum entity states according to claim 15, further comprising the step of:
responding, at least partially, to the at least partial realizing of at least one of the first and second forms of self-interference congener.

17. A method of processing quantum state-entities according to claim 15, wherein said engendering conditioned quantum entity tertiary states involves heterogeneously influencing the quantum entity secondary states.

18. A method of processing quantum state-entities according to claim 15, wherein said engendering ditioned quantum entity tertiary states can occur in at least two alternative manners including at least a first preserving and a first non-preserving manner so that,
quantum entity tertiary states ensuing from the preserving manner can realize the first form of self-interference congener, and
quantum entity tertiary states ensuing from the non-preserving manner can not realize the first form of self-interference congener.

19. A method of processing quantum entity states according to claim 15, wherein the realizing of the at least one of the first and second forms of self-interference congener, from which quantum entity quaternary states ensue, can function in at least two alternative manners including at least a first preserving and a first non-preserving manner so that,
at least one of the first and second forms of self-interference congener s at least partially realizable by quaternary states ensuing from the preserving manner realizing, and at least one of the first and second forms of self-interference congener s not at least partially realizable by quaternary states ensuing from the non-preserving manner realizing.

20. A photon state processing system comprising:

a differentiating beam splitter adapted for producing, from homogeneously influenceable initial photon states, heterogeneously influenceable secondary photon states that can at least partially realize a first form of self-interference congener;

a photon state conditioner adapted for producing, by heterogeneously influencing at least first and second portions of the secondary photon states, conditioned tertiary photon states that can at least partially realize a second form of self-interference congener;

a photon state self-interferer adapted for at least partially realizing the first and second forms of self-interference congener when receiving the secondary and conditioned tertiary photon states, respectively; and a photon state distinguisher adapted for distinguishing at least one of first and second quaternary photon states ensuing, respectively, from the photon state self-interferer's at least partial realizations of the first and second forms of self-interference congener.

21. A photon state processing system according to claim 20, further comprising a photon state deconditioner, adapted for producing tertiary photon states that are not conditioned, said photon state deconditioner operative as at least one of an alternative and an auxiliary to the photon state conditioner.

22. A photon state processing system according to claim 20, wherein the photon state distinguisher functions in at least one of a preserving and a non-preserving manner such that, at least one of the first and second quaternary photon states ensuing from the photon state self-interferer also ensues from the preserving photon state distinguisher, and at least one of the first and second quaternary photon states ensuing from the photon state self-interferer does not also ensue from the non-preserving photon state distinguisher.

* * * * *